Patented Dec. 30, 1952

2,623,885

UNITED STATES PATENT OFFICE 2,623,885

COMPOUNDS OF THE CYCLOPENTANO-POLYHYDROPHENANTHRENE SERIES AND PROCESS OF MAKING SAME

Karl Miescher, Riehen, and Charles Meystre, Basel, Switzerland, assignors to Ciba Pharmaceutical Products, Inc., Summit, N. J.

No Drawing. Application November 7, 1949, Serial No. 126,054. In Switzerland November 17, 1948

2 Claims. (Cl. 260—397.4)

This invention relates to the preparation of compounds of the cyclopentanopolyhydrophenanthrene series by reduction of reducible substituents of compounds of the said series with lithium-aluminum hydride, in which process a 3-positioned $\alpha:\beta$-unsaturated keto-grouping present is not hydrogenated.

A further object of this invention is the preparation of new compounds of the cyclopentanopolyhydrophenanthrene series, such as, for example $\Delta^4$-3-keto-22-hydroxy-bisnor-cholenes.

According to the present invention $\alpha:\beta$-unsaturated 3-ketones of the cyclopentanopolyhydrophenanthrene series are temporarily converted into their enol ethers or cyclic acetals for protection of the 3-positioned keto group and treated, for the purpose of reduction of reducible substituents, with lithium-aluminum hydride.

The $\alpha:\beta$-unsaturated ketones of the cyclopentanopolyhydrophenanthrene series, which contain as reducible substituents for example, a keto, aldehyde, free or esterified carboxyl, an acid chloride, acid anhydride, acid amide or nitro group, may be converted into any convenient enol ether or cyclic acetal. Suitable enol ethers are those of the aliphatic, alicyclic or araliphatic series; in particular alkyl ethers are employed, as for example, methyl, ethyl or propyl ethers. There may be particularly mentioned the enol ethers of $\Delta^4$-3-keto-bisnor-cholenic acid and its acid derivatives, primarily their esters, such as the methyl ester, and also the 3-enol ethers of $\Delta^4$-3:17-androstendione. In the manufacture of the cyclic acetals of these starting materials, particularly of the ethylene glycol, there are used the 1,2-diols or the corresponding alkylene oxides in the presence of an acid catalyst.

The reduction is advantageously carried out in the presence of an indifferent solvent in which the lithium-aluminum hydride is soluble, in particular in the presence of ether, or also of tetrahydrofurane, butyl ether or benzene or of mixtures of such diluents, such as in the presence of a mixture of ether and benzene.

The enol ethers or cyclic acetals of hydroxyketones or amino-ketones obtained in the course of this process can be hydrolyzed in the customary manner in order to produce the corresponding ketones.

The ketones obtained are in part known and in part constitute new compounds. Some of them merit application as therapeutic media. The ketones may also be employed as intermediate products for the manufacture of therapeutically valuable compounds.

The following examples illustrate the invention, the parts being by weight unless otherwise stated and the relationship between parts by weight and parts by volume being the same as that between the kilogram and liter:

Example 1

10 parts of the ethyl enol ether of the methyl ester of $\Delta^4$-3-keto-bisnor-cholenic acid are dissolved in 200 parts by volume of dry ether and slowly added, with exclusion of moisture, to a well stirred mixture of 2.5 parts of lithium-aluminum hydride in 200 parts by volume of dry ether. Thereupon the solution produced is further stirred for 15 minutes and then first carefully treated with 90 parts by volume of water and 170 parts by volume of 10 per cent. sulfuric acid. The ethereal solution is then washed with water, dried and evaporated. The crude enol ether of $\Delta^4$-3-keto-22-hydroxy-bisnor-cholene thus obtained, when recrystallized from ethanol, melts unsharply at 125–144° C.

$([\alpha]_D^{20} = -58.5°$ in chloroform)

The crude enol ether is dissolved in 200 parts by volume of methanol, the solution treated with 10 parts by volume of aqueous 2N-hydrochloric acid and allowed to stand for 24 hours at 20° C. The solution is then evaporated in vacuum, the residue taken up in chloroform and the chloroform solution washed with water, dried and evaporated. The residue is then recrystallized from isopropyl ether, whereby crystals of $\Delta^4$-3-keto-22-hydroxy-bisnor-cholene of melting point 145–147° C. $([\alpha]_D^{22} = +99°$ in chloroform) are obtained.

For the manufacture of the enol ether employed for reduction, for example, the methyl ester of $\Delta^5$-3$\beta$-hydroxy-bisnor-cholenic acid is first oxidized according to Oppenauer with cyclohexanone in the presence of aluminum isopropylate in toluene. The methyl ester of $\Delta^4$-3-keto-bisnor-cholenic acid thus obtained, which when recrystallized from acetone melts at 183–184° C., is then converted in the customary manner with orthoformic acid ethyl ester in acidified ethanol solution into the corresponding ethyl enol ether, which when recrystallized from methanol melts at 103–106° C.

Example 2

2 parts of the 3-ethyl enol ether of $\Delta^4$-3:17-androstendione are dissolved in 200 parts by volume of dry ether and slowly added, with exclusion of moisture, to a well stirred mixture of 0.5 part of lithium-aluminum hydride in 100 parts by volume of dry ether. The solution produced is further stirred for 15 minutes and thereupon carefully treated with 20 parts by volume of water and 40 parts by volume of 10 per cent. sulfuric acid. The ethereal solution is then washed with water, dried and evaporated. The crude enol ether of $\Delta^4$-3-keto-17-hydroxy-androstene is, without further purification, dissolved in 100 parts by volume of alcohol and the solution treated with 10 parts by volume of 2N-hydrochloric acid and allowed to stand for 24 hours. The solution is thereupon evaporated in vacuum and in this manner the crude $\Delta^4$-3-keto-17-hydroxy-androstene (testosterone) obtained, which can be purified in the customary manner. For example, from diluted acetone, needles are obtained of melting point 152–153° C. ($[\alpha]_D^{19}=+109°$ in ethanol).

*Example 3*

10 parts of the 3-ethyl enol ether of $\Delta^4$-pregnene-17$\beta$-ol-3-one-21-acid methyl ester are dissolved in 250 parts by volume of dry ether and slowly added, with exclusion of moisture, to a well stirred mixture of 2.5 parts of lithium-aluminum hydride in 200 parts by volume of dry ether. The solution produced is further stirred for 15–20 minutes and thereupon carefully treated with 100 parts by volume of water and 170 parts by volume of sulfuric acid of 10 per cent. strength. The ethereal solution is then washed with water, dried and evaporated. The crude ethyl enol ether of $\Delta^4$-pregnene-17$\beta$,21-diol-3-one thus obtained is dissolved in 250 parts by volume of methanol and the solution treated with 15 parts by volume of 2N-aqueous hydrochloric acid and allowed to stand at room temperature for 1–2 days. The solution is thereupon evaporated in vacuum and taken up in chloroform. The chloroform solution is washed with water, dried and evaporated. Upon recrystallization from a mixture of isopropylether-hexane, the residue produces $\Delta^4$-pregnene-17$\beta$,21-diol-3-one of melting point 243–246° C.

The ethyl enol ether of $\Delta^4$-pregnene-17$\beta$-ol-3-one-21-acid methyl ester, used as starting material, is obtained from $\Delta^4$-androstene-3,17-dione-3-ethyl enol ether by condensation with bromo acetic acid ester and zinc according to the method of Reformatzky.

*Example 4*

A solution of 2 parts of the 3-ethyl enol ether of $\Delta^{4,17}$-pregnadiene-3-one-21-acid-methyl ester in 200 parts by volume of dry tetrahydrofurane is added, with exclusion of moisture, to a well stirred mixture of 2.5 parts of lithium-aluminum hydride and 200 parts by volume of dry tetrahydrofurane. Stirring is continued for another 10–20 minutes whereupon 20 parts by volume of water, then 180 parts by volume of sulfuric acid of 10 per cent. strength and finally ether are added gradually. The ethereal solution is then washed with water, dried and evaporated. The crude ethyl enol ether of $\Delta^{4,17}$-pregnadiene-21-ol-3-one obtained is dissolved in 200 parts by volume of ethanol and the solution treated with 20 parts by volume of 2N-hydrochloric acid and allowed to stand at room temperature for 1–2 days. The solution is thereupon evaporated in vacuum and the crude $\Delta^{4,17}$-pregnadiene-21-ol-3-one obtained purified in the customary manner. Upon crystallization from acetone-methanol it melts at 135–137° C.

The starting material in the above example, namely the 3-ethyl enol ether of $\Delta^{4,17}$-pregnadiene-3-one-21-acid-methyl ester, is obtained from the 3-enol ether of $\Delta^4$-androstene-3,17-dione by condensation with bromo acetic acid ester and zinc according to the method of Reformatzky, and subsequent splitting off water, for example, by means of iodine.

Having thus described the invention, what is claimed is:

1. Process for the reduction of compounds of the cyclopentanopolyhydrophenanthrene series, which comprises treating a member of the group consisting of $\Delta^4$-3-keto-bisnor-cholenic acid and $\Delta^4$-3-keto-bisnor-cholenic acid derivatives in the form of a member of the group consisting of 3-enol-ethers and 3-cyclic acetals with lithium-aluminum hydride and hydrolyzing the so formed reaction product, whereby $\Delta^4$-3-keto-22-hydroxy-bisnor-cholene is obtained.

2. The $\Delta^4$-3-keto-22-hydroxy-bisnor-cholene melting at about 145–147° C.

KARL MIESCHER.
CHARLES MEYSTRE.

REFERENCES CITED

The following references are of record in the file of this patent:

UNITED STATES PATENTS

| Number    | Name       | Date           |
|-----------|------------|----------------|
| 2,166,877 | Reichstein | July 18, 1939  |
| 2,183,589 | Reichstein | Dec. 19, 1939  |
| 2,294,433 | Westphal   | Sept. 1, 1942  |
| 2,324,522 | Logemann   | July 20, 1943  |
| 2,356,154 | Fernholz   | Aug. 22, 1944  |
| 2,462,133 | Sarett     | Feb. 22, 1949  |

OTHER REFERENCES

Nystrom: Jour. Am. Chem. Soc. 69, 1197–1199 (1947).

Ott et al.: Abstract of the 113th meeting of Am. Chem. Soc., page 17K, April 1948.